United States Patent [19]

Symens et al.

[11] 4,094,754

[45] June 13, 1978

[54] LEACHING OF NI-CU-FE-S MATTE

[75] Inventors: Raymond D. Symens, Arvada; Paul B. Queneau, Golden; Eddie C. J. Chou, Arvada; Franklin F. Clark, Golden, all of Colo.

[73] Assignee: Amax Inc., Greenwich, Conn.

[21] Appl. No.: 775,169

[22] Filed: Mar. 7, 1977

[51] Int. Cl.² ............................................. C25C 1/12
[52] U.S. Cl. .................................. 204/108; 423/34; 423/41; 423/150
[58] Field of Search ............... 423/36, 34, 41, 45, 423/48, 150; 75/115, 117, 119; 204/108, 112

[56] References Cited

U.S. PATENT DOCUMENTS

| | | | |
|---|---|---|---|
| 3,293,027 | 12/1966 | Mackiw et al. | 75/119 |
| 3,741,752 | 6/1973 | Evans et al. | 423/150 |
| 3,914,374 | 10/1975 | Koehler et al. | 423/150 |
| 3,962,051 | 6/1976 | Symens et al. | 423/48 |

OTHER PUBLICATIONS

Llanos et al. "Atmospheric Leaching of Matte at the Port Nickel Refinery" C.I.M. Bulletin, Feb., 1974, pp. 74-81.

*Primary Examiner*—Brian Hearn
*Attorney, Agent, or Firm*—Michael A. Ciomek; Eugene J. Kalil

[57] ABSTRACT

Nickel is selectively leached efficiently and rapidly from Ni-Cu-Fe-S matte under oxidizing conditions at ordinary pressure by controlling in combination the following variables: (1) the acid-to-copper mole ratio in the leaching solution, (2) the temperature, and (3) the sulfur content of the matte, whereby an enriched nickel solution is obtained low in copper and iron.

14 Claims, 8 Drawing Figures

LEACHING OF NI-CU-FE-S MATTE

This invention relates to a method of improving the leaching kinetics of iron-containing nickeliferous sulfide matte and to a method for the atmospheric leaching of Ni-Cu-Fe-S matte containing relatively high iron ranging from about 0.5% to 8% as a first step in the recovery of metal values therefrom in a multistep process.

STATE OF THE ART

Early attempts in the atmospheric leaching of high-iron nickel-copper sulfide matte with sulfuric acid were mainly confined to the selective leaching of nickel with the aim of subsequently recovering copper from the residue. A problem in such leaching was the build-up of copper and iron in the nickel solution which had to be removed before pure nickel could be recovered.

For example, in Carrick U.S. Pat. No. 939,947 (Nov. 9, 1909) and in the Schlect et al U.S. Pat. No. 2,753,259 (Nov. 18, 1950), the atmospheric leaching process disclosed apparently did not permit the pH to exceed 4 as evidenced by the fact that copper and iron were not sufficiently rejected from solution during leaching. In Shuler U.S. Pat. No. 967,072 (Aug. 9, 1910), Pawel U.S. Pat. No. 1,276,809 (Aug. 27, 1918), Peek U.S. Pat. No. 1,569,137 (Jan. 12, 1926), Hybinette U.S. Pat. No. 1,577,422 (Mar. 16, 1926), the Llanos et al article in the C.I.M. Bulletin (74, February, 1974) and the P. B. Queneau et al article in Metallurgical Transactions B (6B, pps. 149–157, 1975), the leaching was confined to low-iron matte which minimizes the problem of high residual iron in the final leach solution.

In the Udy British Pat. Nos. 656,140, 656,141 and 656,142, the leaching of high-iron nickel-containing matte with sulfuric acid is such that non-ferrous metal values remain in the residues, the nickel extraction being negligible.

A problem in the atmospheric leaching of nickeliferous matte under oxidizing conditions is that the leaching characteristics of matte tend to vary from composition to composition, whether the matte contained high or low sulfur, high or low iron and whether the matte was in the as-cast or granulated state. To assure a nickel leach solution low in copper and iron, rather extended leach times of upwards of 9 hours were necessary to reach a final pH of over 5 necessary for rejecting residual copper and iron each to below 20 ppm or 10 ppm.

Recent attempts have been made to leach high-iron mattes (0.5% to 20% Fe) using a two-stage atmospheric leach process (U.S. Pat. No. 3,962,051, issued June 8, 1976). The process comprises a first stage atmospheric leach in which the solution is aerated during the acid leach until the solution reaches a pH of about 3.5 to 4.5, which is then followed by a second stage atmospheric leach in which a stronger oxidant, such as oxygen, is used in place of air, and the leaching continued until a pH of over about 5 is reached to reject both copper and iron from solution, the overall leaching time being reduced considerably. In a preferred aspect of the process, the matte feed is first preleached to remove selectively as much iron as possible before conducting the main atmospheric leach process. A disadvantage of this process is the increase in cost due to the preleach step and to the use of stronger oxidants.

It would be desirable to provide an atmospheric leach process for rapidly extracting substantial amounts of nickel from high-iron nickeliferous matte that rapidly rejects copper and iron from the nickel leach solution, that enables the rapid neutralization of the acid in the spent electrolyte, that does not require the further addition of external energy to the leaching bath, that does not require the preleaching of the matte to reduce the iron content, and that does not require an additional oxidant other than that provided by aeration.

OBJECTS OF THE INVENTION

It is thus an object of the invention to provide an improved atmospheric leaching process for the selective dissolution of nickel from Ni-Cu-Fe-S matte containing relatively high iron ranging from about 0.5% to 8% by weight.

Another object is to provide an improved atmospheric leach process for rapidly selectively leaching nickel from Ni-Cu-Fe-S matte and, at the same time, reject copper and iron from the leach solution to low levels.

These and other objects will more clearly appear from the following disclosure and the accompanying drawings, wherein.

STATEMENT OF THE INVENTION

Figure 1:
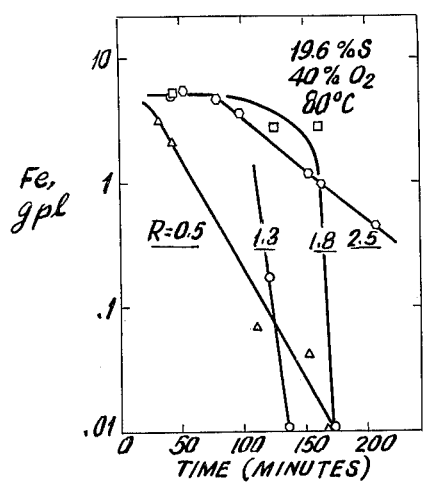
FIGS. 1 and 1A are curves depicting iron and copper concentrations, respectively, as a function of leaching time and acid-to-copper mole ratio in the leaching solution for matte containing 19.6% S by weight.

One embodiment of the invention is directed to the atmospheric leaching of nickel-copper-sulfide matte containing nonstoichiometric amounts of sulfur, the matte containing by weight about 20% to 75% nickel, about 5% to 50% copper, about 13% to 23% sulfur, over 0.5% to about 8% iron, the sum of the nickel, copper and sulfur contents being at least about 80% of the matte composition with the balance gangue or slag and incidental impurities, the amount of the sulfur in the matte being less than that required stoichiometrically to combine with the metal values therein. Because of the iron content, it may be preferred that the matte feed be prepared by granulating it by quenching it from the molten state. For example, the molten matte may be quenched from a temperature of at least about 10° C above its solidus-liquidus temperature but below the matte boiling point. The matte is then finely comminuted, for example comminuted to a size corresponding to at least about 50% by weight through a 270 mesh screen (U.S. Standard). However, we are not limited to such a size so long as the matte is in particulate form sufficient to assure the desired dissolution during leaching without undue foaming. Matte ground to provide 50% through 200 mesh may be used. In carrying out the atmospheric leaching step, an aqueous pulp is formed of said comminuted matte, for example, a pulp having a solids density ranging from about 5% to 65%, typically 15%, the pulp being formed in a spent copper electrolyte solution containing sulfuric acid sufficient to provide a pH not exceeding about 2 prior to forming the pulp. A preferred pulp range is 10% to 40%.

The invention resides in adjusting the acid-to-copper mole ratio in the leach solution ($H_2SO_4:Cu^{++}$) fed to the atmospheric leach circuit, the matte sulfur content, reactor temperature and the oxidation conditions to produce a process response as evidenced by relatively fast leaching heretofore not attainable in the leaching of nickel-copper sulfide matte containing over 0.5% Fe, e.g. up to about 8% Fe, such as 1% to 5% iron by weight of said matte. The process responses attainable with the invention are relatively rapid acid neutralization, consistently high nickel extraction, and close control of aqueous copper and iron. The process can handle high aqueous nickel concentration (e.g. 96 gpl of $Ni^{++}$) as well as leaching solutions containing aqueous ammonium sulfate (e.g. 10 gpl) with little effect on reaction time or selectivity.

The sulfuric acid-copper sulfate solution may be a spent electrolyte solution. Whatever the solution, it preferably contains about 40 gpl to 120 gpl $H_2SO_4$ and about 15 gpl to 45 gpl $Cu^{++}$.

By employing the foregoing leach solution, the leaching is selectively controlled to dissolve substantial amounts of nickel from the matte fairly rapidly while rejecting dissolved copper and iron from the solution.

By the proper adjustment of the acid-to-copper mole ratio, matte sulfur content and leaching temperature under appropriate oxidizing conditions, a choice among several alternatives is available to the operator in the production of the pregnant liquor as follows:

(1) The production of a pregnant liquor (typically 70 to 90 gpl Ni at a pH of 4.5 to 5.5) containing less than 20 ppm Cu and a portion of the iron (<1000 ppm), the foregoing being a preferred practice.

(2) The production of a pregnant liquor containing less than 20 ppm Cu and less than 20 ppm Fe. However, this practice requires adjustment of oxidation potential during the final stage of leaching.

(3) The production of a pregnant liquor containing less than 20 ppm Fe and a portion of the copper at less than 1000 ppm.

In carrying out the invention, the leaching is selectively controlled to dissolve substantial amounts of nickel by controlling the following parameters:

adjusting the ratio of leach solution to matte so as to provide about 0.4 to 0.8 mole of $H_2SO_4$ plus copper solution per mole of nickel in said matte;

adjusting the mole ratio of $H_2SO_4$ to copper in the solution to less than about 1.5:1 at a temperature less than about 70° C for mattes containing less than about 16% S; or by adjusting the mole ratio of $H_2SO_4$ to copper in solution to at least about 1.8:1 at a temperature of over about 75° C for mattes containing over about 17% S; and continuing the leaching of the matte under the foregoing controlled conditions whereby rapid dissolution of nickel is effected and a pregnant liquor provided in which at least one of the copper or iron in said solution is rejected to below 20 ppm.

A preferred embodiment for the treatment of matte containing at least about 17% sulfur (that is, ranging from about 17% to 23%) is given as follows:

(A) Such that to obtain a final nickel solution containing less than about 20 ppm copper and less than about 1000 ppm iron, the acid-to-copper mole ratio is controlled to at least about 1.5:1 at a temperature of over about 75° C. This system generates its own heat due to the high acid-to-copper mole ratio.

(B) Such that to obtain a final nickel solution containing less than about 20 ppm copper and less than about 20 ppm iron, the acid-to-copper mole ratio is controlled at about 1:1 to 1.8:1 at a temperature of about 60° C to 80° C.

(C) Such that to obtain a final nickel solution containing less than about 1000 ppm copper and less than about 20 ppm iron, the acid-to-copper mole ratio is controlled at less than about 1:1 with the temperature maintained at less than about 75° C.

Another preferred embodiment for the treatment of matte containing no more than 16% sulfur (that is ranging from 13% to 16%) is given as follows:

(1) Such that to obtain a final nickel solution containing less than about 20 ppm copper and less than about 1000 ppm iron, the acid-to-copper mole ratio is controlled to at least about 1.5:1 at a temperatue of over about 75° C. This system generates its own heat due to the high acid-to-copper mole ratio.

(2) Such that to obtain a final nickel solution containing less than about 20 ppm copper and less than about 20 ppm iron, the acid-to-copper mole ratio is controlled at less than about 1.5:1 at a temperatue of less than about 70° C.

DETAILS OF THE INVENTION

Tests were conducted using a 500 ml reaction kettle agitated at 800 rpm with a 2¼ inch axial turbine. The gas flow was applied at a rate of 0.1 SCFM/gal delivered into the solution below the eye of the impeller.

The tests were applied on two matte feeds as follows:

Table 1

| Type | % S | % Ni | % Cu | % Fe |
|---|---|---|---|---|
| High Sulfur Matte | 19.6 | 40.7 | 34.3 | 2.1 |
| Low Sulfur Matte | 15.2 | 49.0 | 28.1 | 3.0 |

The total sulfur, nickel, copper and iron content is 96.7% for the high sulfur matte and 95.3% for the low sulfur matte, the balance being gangue and other impurities.

Five different electrolytes were tested with varying mole ratios of $H_2SO_4$ to copper in the solution.

Table 2

| Solution | Mole Ratio $H_2SO_4$/Cu | $H_2SO_4$ gpl | Cu gpl |
|---|---|---|---|
| 1 | 0.5:1 | 66 | 84 |
| 2 | 1.0:1 | 98 | 64 |
| 3 | 1.3:1 | 112 | 55 |
| 4 | 1.8:1 | 126 | 45 |
| 5 | 2.5:1 | 140 | 36 |

The atmospheric leaching was carried out at a pulp density of 14% solids, the amount of solution being 450 ml, a small amount of an antifoaming agent being added to the solution (about 9 ppm Aerosol GPG). The leaching was carried out at a temperature of 80° C for time periods up to about 200 minutes (3⅓ hours) using solutions with the acid-to-copper mole ratios including 0.5:1, 1.3:1, 1.8:1 and 2.5:1.

Figure 1A:
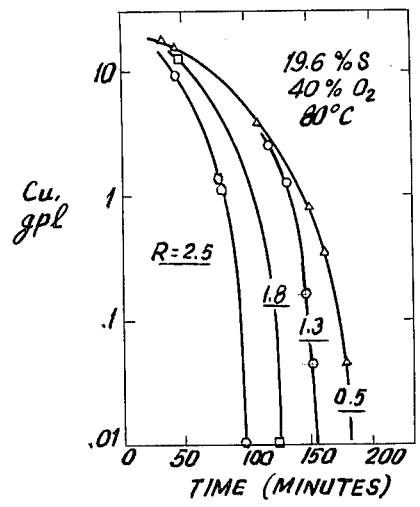

It was noted from the results of the tests shown in FIGS. 1 and 1A that the mole ratio of $H_2SO_4$ to $Cu^{++}$ could be used to control whether copper or iron would remain in the final neutralized solution. The higher the acid-to-copper ratio of the electrolyte, the more quickly copper is rejected from the solution and the longer it takes for iron to be rejected. In FIG. 1, it will be noted that the test conducted on high sulfur matte with regard to iron rejection showed that, at an acid-to-copper mole ratio of 2.5:1, substantial amounts of iron remained in the solution after 200 minutes, i.e., approximately 1000 ppm iron; whereas, in FIG. 1A, the copper is rejected to 10 ppm or less in 98 minutes. Under the foregoing conditions, the copper is easily rejected at an acid-to-mole ratio of at least 1.5:1 to below 10 ppm at about 140 minutes of leaching, whereas, at above this mole ratio (over 1.5:1), the iron takes a much longer time to be rejected and is rejected to less than 1000 ppm.

The acid-to-copper mole ratio also has an impact on nickel extraction, especially when high extraction levels are attempted. The higher the mole ratio, the higher is the nickel extraction. Note Table 3 below:

Table 3

| EFFECT OF ELECTROLYTE RATIO ON NICKEL EXTRACTION (80° C) | | | | |
|---|---|---|---|---|
| Electrolyte Ratio | % S in Matte | Vol. % $O_2$ in Gas | % Ni Extn., Attempted | % Ni Extn. |
| 0.5 | 19.6 | 40 | 63 | 49 |
| 1.3 | " | " | " | 56 |
| 2.5 | " | " | " | 59 |
| 1.0 | " | " | " | 54* |
| 1.3 | " | " | " | 55* |
| 1.8 | " | " | " | 60* |
| 0.5 | 15.2 | " | 52 | 42 |
| 1.0 | " | " | " | 42 |
| 1.8 | " | " | " | 40 |

*These experiments included 10 gpl $(NH_4)_2SO_4$

Attempted nickel extraction is calculated by assuming one mole of either $H_2SO_4$ or $Cu^{++}$ will leach one mole of nickel from the matte.

EFFECT OF MATTE SULFUR CONTENT

Tests have shown that the initial sulfur level in the matte has an effect on the leaching characteristics of the matte. For example, at 15.2% S, the rate of rejection of copper from solution is markedly increased as will be noted by comparing FIG. 2A to FIG. 1A. In contradistinction, the penalty is slower iron rejection, upwards of over 300 or 400 minutes being required at acid-to-copper mole ratio higher than 1.8 to effect decrease in iron concentration (FIG. 2); whereas, rapid copper rejection is effected in less than 60 minutes regardless of the acid-to-copper ratio. Thus, to decrease both iron and copper each to below 20 ppm, the acid-to-copper mole ratio should be maintained to below 1.5:1 for low sulfur matte; or, if desired, by controlling the acid-to-copper mole ratio at over 1.5:1, e.g. 1.8:1 to 2.5:1, the pregnant solution may be controlled to contain less than about 10 ppm copper and less than 1000 ppm iron.

Figure 2:
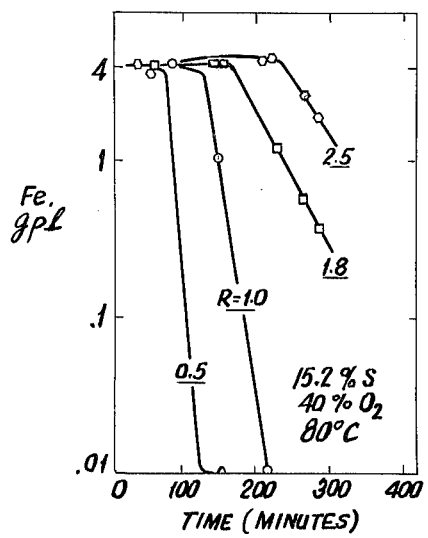
FIGS. 2 and 2A are curves showing the iron and copper concentrations, respectively, as a function of leaching time and acid-to-copper mole ratio in the leaching solution for matte containing 15.2% S by weight.
Figure 2A:
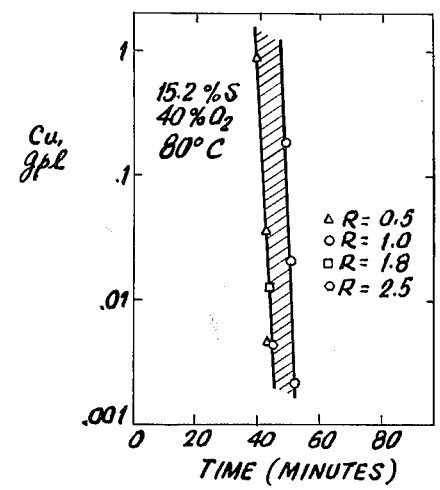

Comparing FIG. 2 to FIG. 1, it will be noted that the iron removal is indicated as being quite sluggish in FIG. 2 (15.2% S) in that upwards of 400 minutes leaching time was required at an acid-to-copper mole ratio of 1.8:1; whereas, in FIG. 1 (19.6% S), the time was less than 200 minutes.

THE TEMPERATURE EFFECT

Figure 3:
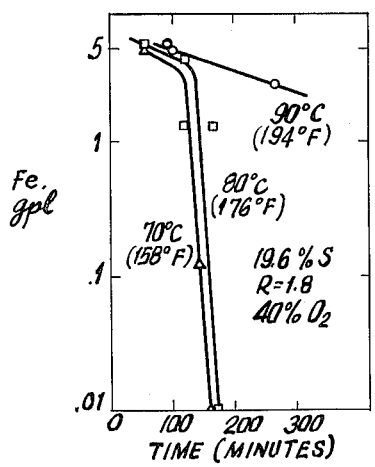
FIGS. 3 and 3A show curves depicting the iron and copper concentrations, respectively, as a function of leaching time and temperature for matte containing 19.6% S by weight.
Figure 3A:
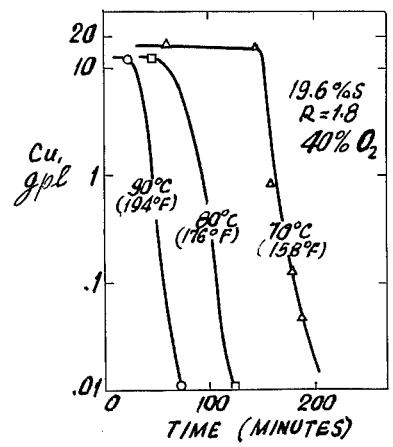
Figure 4:
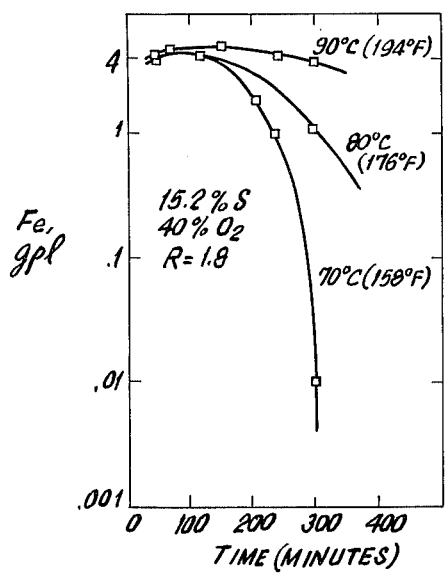
FIGS. 4 and 4A are similar to FIGS. 3 and 3A except that the matte leached contains 15.2% S by weight.
Figure 4A:
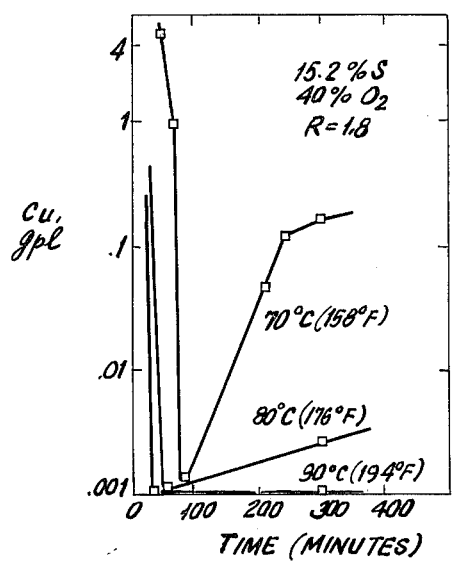

A standard technique for accelerating oxidation and precipitation of iron from the leach liquor is to raise the temperature. However, this technique does not work when processing high-iron matte. Surprisingly, tests results have shown that, to accelerate iron removal, the leaching temperature should be reduced. On the other hand, the opposite is true with regard to copper as will be noted by comparing FIG. 3 (iron rejection) to FIGS. 3A (copper rejection) for the leaching of high-sulfur matte. Corresponding results are indicated with low-sulfur matte as will be noted by comparing FIG. 4 (iron rejection) to FIG. 4A (copper rejection).

Thus, with either high or low-sulfur matte, copper is preferably more rapidly rejected than iron at temperatures in excess of 75° C.

It is apparent from the test results illustrated in FIGS. 1 to 4 (iron rejection) and in FIGS. 1A to 4A (copper rejection) that the iron and copper content of the pregnant solution can be predetermined by controlling the parameters in combination. This enables a broad range of versatility in carrying out the atmospheric leaching program for the selective recovery of nickel.

As economics is one of the main considerations in the overall recovery of nickel and copper from the matte, it is possible to control the kinetics of the atmospheric leach reaction to effect optimum yield of nickel while rejecting copper and iron from solution in the shortest time.

As stated earlier, a preferred practice is to leach the matte, regardless of sulfur content to provide a pregnant liquor (typically 70 to 90 gpl Ni at a pH of 4.5 to 5.5) containing less than about 10 ppm Cu and a portion of the iron at less than about 1000 ppm. This can be achieved by employing an atmospheric leach program in which substantial nickel dissolution from the matte is selectively effected, for example, in less than 200 minutes, e.g. less than 150 minutes, while rejecting substantially all of the copper. The preferred conditions comprise employing an acid-to-copper mole ratio in the starting leaching solution of at least about 1.5:1 at a temperature of over about 70° C. Compare FIG. 1A (copper rejection) to FIG. 1 (iron rejection) and FIG. 2A (copper rejection) to FIG. 2 (iron rejection).

As will be noted by comparing the figures, a low copper pregnant liquor is assured. The iron in the nickel solution is easily removed by aerating the solution (following the removal of the matte residue) and adding ammonia as required to neutralize the acid generated. Since generally the nickel is recovered from the solution by high temperature-high pressure reduction with hydrogen gas in an autoclave, ammonia is added to the solution in any event.

OXIDATION DURING LEACHING

The oxidation of the solution during leaching should be adequate to assure optimum nickel dissolution and to effect rejection of copper and iron. Too much oxidation interferes with copper rejection. Thus, care should be exercised to avoid excessive gas input before a pH of 4 is reached in the solution during the early stages of leaching.

The effect of gas input on the response of high-iron matte to atmospheric leaching using oxygen-enriched air containing 40% by volume of oxygen will be apparent from Table 4 below.

TABLE 4

| EFFECT OF GAS INPUT RATE ON THE RESPONSE OF HIGH-IRON MATTE TO ATMOSPHERIC LEACHING | | | |
|---|---|---|---|
| ($H_2SO_4$/Cu = 1. 19.6% S, 80° C, 40% $O_2$, 63% Attempted Ni Extn.) | | | |
| | Test Number | | |
| | 6 | 7 | 8 |
| Gas Flow, SCFM/Gal | 0.01 | 0.04 | 0.1 |
| Minutes to pH 4 | 198 | 114 | 127 |
| Minutes to pH 5 | 215 | 135 | 168 |

TABLE 4-continued

EFFECT OF GAS INPUT RATE
ON THE RESPONSE OF HIGH-IRON MATTE
TO ATMOSPHERIC LEACHING
($H_2SO_4$/Cu = 1. 19.6% S, 80° C, 40% $O_2$,
63% Attempted Ni Extn.)

|  | Test Number | | |
| --- | --- | --- | --- |
|  | 6 | 7 | 8 |
| ppm Cu at pH 4 | 840 | 2400 | 4000 |
| ppm Cu at pH 5 | 4 | 16 | 48 |
| ppm Fe at pH 4 | 6 | 38 | 78 |
| ppm Fe at pH 5 | 1 | 1 | 1 |
| Nickel Extn., % | 54 | 53 | 51 |

As will be noted, the gas flow rate of Test No. 7 gave a maximum rate of nickel extraction and acid neutralization. At a pH of 4, large amounts of copper were retained in the solution; whereas, at a pH of 5, the copper was reduced to below 20 ppm. Copper was substantially over 20 ppm in Test No. 8 due to excessive aeration with oxygen-enriched air during the post-pH 4 portion of the test. This is also apparent by referring to FIG. 4A. Too little gas input should also be avoided in that not enough oxygen is provided to oxidize $Ni_3S_2$ to the extent necessary to complete the reaction and effect major consumption of the acid in solution, see Test No. 6, which was slowest of all.

In a study made on the effect of reduced gas flow during various stages of the pre-pH 4 reaction period, it was noted that reducing the flow period between pH 2.5 and 4 assisted most the rate of solution neutralization. In this connection, reference is made to Table 5 below, in particular, Test No. 13.

Table 5

EFFECT OF REDUCTION OF GAS
FLOW RATE BEFORE pH 4 IS ATTAINED
(R = 1.8, S = 19.6%, 80° C, 63% Attempted Ni. Extn.,
40% $O_2$, base gas flow = 0.1 SCFM/gal)

| Period of Gas Flow Cut, Min. | pH Range of Gas Cut | Minutes to pH 4 | Test No. |
| --- | --- | --- | --- |
| None | — | 125 | 9 |
| 0 to 40 | 1.5 to 1.8 | 141 | 10 |
| 0 to 156 | 1.5 to 5.0 | 130 | 11 |
| 40 to 80 | 2.6 to 3.5 | 108 | 12 |
| 40 to 150 | 2.4 to 4.0 | 102 | 13 |
| 80 to 120 | 3.5 to 4.0 | 131 | 14 |

The post pH 2.5 period occurs when substantial quantities of metallic copper are present in the leach residue (due to the earlier cementation of copper on the metallic nickel constituent of the matte feed). Strong aeration apparently oxidized the accumulated metallic copper which results in soluble copper that must later be reprecipitated. Strong aeration in the beginning of the reaction period would thus not be detrimental in that the inventory of metallic copper has not had a chance to build up.

Normally, aeration of the leach solution is carried out in a confined column of said solution using commercial reactors which are typically 10 to 30 feet deep and which operate at sea level. Thus, the use of 40% by volume of oxygen in air simulates the partial pressure of oxygen when air is injected into the bottom of the tank due to hydrostatic pressure. For example, 40% oxygen gas at Denver is approximately 0.32 atmosphere of oxygen, which is approximately the oxygen partial pressure developed in the bottom of an aerated 20 foot deep tank located at sea level. The leaching is typically carried out at an oxygen partial pressure ranging from about 0.2 to 0.5 atmosphere. Tests conducted at low oxygen partial pressure (19% $O_2$ is equivalent to about 0.15 atm. $O_2$) resulted in substantially no iron rejection when reacting low sulfur matte (15.2% S) using a solution with a high acid-to-copper ratio. Tests indicated that, as the acid-to-copper mole ratio is decreased with decreased sulfur content in the matte, the leaching could be carried out at lower oxygen partial pressure.

ATTEMPTED NICKEL EXTRACTION

As stated hereinbefore, attempted nickel extraction is the calculated value determined by assuming that one mole of either $H_2SO_4$ or $Cu^{++}$ will leach one mole of nickel from the matte.

As attempted nickel extraction is increased (i.e. by increasing the quantity of electrolyte solution used to leach a given quantity of matte), the time to reach a given pH also increases. However, we have observed that too low an attempted extraction leads to slow iron precipitation as will clearly appear by referring to Table 6 below.

TABLE 6

EFFECT OF ATTEMPTED NICKEL EXTRACTION
ON ATMOSPHERIC LEACHING RESPONSE
($H_2SO_4$/Cu = 1.8, 19.6% S, 80° C, 19% $O_2$)

| Test No. | Attempted Ni Extn., % | Actual Ni Extn., % | Min. to pH 4.5 | ppm at pH 4.5 | |
| --- | --- | --- | --- | --- | --- |
|  |  |  |  | Cu | Fe |
| 15 | 57 | 55 | 175 | 1 | 2000 |
| 16 | 63 | 60 | 170 | 1 | 1300 |
| 17 | 69 | 66 | 290 | 3 | 2 |
| 18 | 74 | 70 | 300 | 2700 | 700 |

Tests have indicated that aqueous nickel and ammonium sulfate concentration have only a small effect on reaction time and leaching selectivity. Solutions containing 56 to 96 gpl nickel with and without 10 gpl ammonium sulfate were tested for atmospheric leaching response. Both nickel and ammonium sulfate appear to increase slightly the level of aqueous copper in solution while iron tends to decrease. Nickel extraction is slightly improved.

An all-at-once addition of spent electrolyte leaching solution to the comminuted matte results in an increase in the rate of copper and iron rejection; however, nickel extraction decreases.

AGITATION DURING LEACHING

Tests have shown that the higher the impeller RPM during leaching, the greater is the rate of nickel extraction as shown by comparing Tests No. 19 and No. 20 below:

TABLE 7

($H_2SO_4$/Cu = 1.8, 19.6% S, 80° C, 19% $O_2$)

| Test No. | Impeller RPM | Minutes pH 4.5 | Filtrate | | % Ni Extraction |
| --- | --- | --- | --- | --- | --- |
|  |  |  | gpl Cu | gpl Fe |  |
| 19 | 800 | 175 | 0.001 | 1.3 | 60 |
| 20 | 1200 | 135 | 0.001 | 1.0 | 60 |

At 1200 RPM, it took only 135 minutes to obtain 60% nickel extraction as compared to 175 minutes at 800 RPM. The reaction rate can also be increased by efficient gas dispersion into the solution. In one test, it was found that, by replacing an 800 RPM axial turbine stirrer (diameter = 2¼ inches) with a 1200 RPM radial turbine (diameter = 2 inches), the total atmospheric leaching time could be decreased from 168 minutes to 95 minutes.

In a large scale test, in which 600 tons of matte were treated in five series-connected leach tanks at temperatures ranging from about 162° F to 177° F (72° C to 80°

C) at an average acid-to-copper mole ratio of about 2:1, 330,000 pounds of nickel were extracted to provide a final nickel solution containing about 12 ppm Cu and 33 ppm Fe. No heat was added to the circuit as the heat of reaction was sufficient to maintain the reaction temperature. A high $H_2SO_4/Cu^{++}$ mole ratio (e.g a ratio greater than 1.5:1) is generally necessary to maintain high heat generation during leaching. The airflow was varied from 1350 SCFM in the first of the five leaching tanks and reduced to 0 SCFM in the fifth or last leaching tank controlling the rejection of copper and iron from solution.

As described in U.S. Pat. No. 3,962,051, the atmospheric leaching of nickel from matte constitutes the first stage of metal recovery in a broader flow sheet.

For example, the residue remaining from the atmospheric leach which is rich in copper and also contains nickel is subjected to elevated temperature and pressure in an autoclave. For example, a pulp is formed at about 20% solids and acid and spent electrolyte added to provide sufficient total sulfur to produce soluble nickel and copper sulfates. The pulp is subjected to an oxidation leach step at an elevated temperature and pressure of about 175° C to 210° C at a pressure of about 200 psig to 900 psig, the time of leaching being about 30 minutes. The pregnant solution generally contains about 40 to 80 gpl Ni, about 40 to 60 gpl Cu and about 5 to 20 gpl $H_2SO_4$. The pregnant liquor is separated from the leach residue, the solids being sent to tails, and the pregnant liquor then sent to copper electrowinning where a substantial portion of the copper is recovered as high grade electro-copper, the spent electrolyte containing about 60 gpl Ni, 25 gpl Cu and 70 gpl sulfuric acid, the electrolyte being diluted with process make-up water when necessary. The spent liquor is then recycled to the first stage atmospheric leach. Additional make-up acid may be added, depending on the acid-to-copper mole ratio desired in the leach solution.

Copper electrowinning is well known and need not be gone into detail here.

Broadly speaking, the pregnant liquor before electrowinning will generally contain about 40 to 80 gpl Ni, about 40 to 60 gpl Cu and about 5 to 20 gpl $H_2SO_4$.

The leaching solution, which may or may not be spent electrolyte, may contain about 0 to 80 gpl Ni, about 5 to 100 gpl Cu, and 5 to 200 gpl $H_2SO_4$.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of controlling the atmospheric leaching kinetics of comminuted nickeliferous sulfide matte containing about 20% to 75% nickel, about 5% to 50% copper, non-stoichiometric sulfur in the range of 17% to 23% and over 0.5% to about 8% iron, the sum of the nickel, copper and sulfur contents being at least about 80%, and thereby selectively effect the rapid dissolution of substantial amounts of nickel from said matte and leave a residue impoverished in said nickel, which comprises, providing said matte in particulate leachable form, subjecting said particulate matte to atmospheric leaching under oxidizing conditions in a confined column of sulfuric acid-copper sulfate solution containing about 10 gpl to 200 gpl $H_2SO_4$ and 5 gpl to 100 gpl copper, with the mole ratio of $H_2SO_4$ to copper in said leach solution ranging from about 0.5:1 to 2.5:1 and the temperature from about 50° C to 100° C, the amount of solution being such as to provide about 0.4 to 0.8 mole of said $H_2SO_4$ plus copper in said solution for each mole of nickel in said matte while injecting a flow of air into the bottom of said solution column at a rate and a partial pressure of oxygen sufficient to sustain said rapid dissolution of nickel, selectively controlling the kinetics of said leaching to effect rapid dissolution of substantial amounts of nickel from said matte while controlling the residual amounts of copper and iron in the final pregnant solution to below predetermined amounts:

(A) such that to obtain a final nickel solution containing less than about 20 ppm copper and less than about 1000 ppm iron, the acid-to-copper mole ratio is controlled to at least about 1.5:1 at a temperature of over about 75° C; and (B) such that to obtain a final nickel solution containing less than about 1000 ppm copper and less than about 20 ppm iron, the acid-to-copper mole ratio is controlled at less than about 1:1 with the temperature at less than about 75° C.

2. The method of claim 1, wherein following the completion of said atmospheric leach, the residue thereof is subjected to sulfuric acid leaching using air as an oxidant at elevated temperature and pressure to dissolve the metal values nickel and copper therein, and the solution then subjected to copper electrowinning to produce electrolytic copper and a spent sulfuric acid-copper sulfate electrolyte, the spent electrolyte providing solution for use in the atmospheric leaching of said matte.

3. A method of controlling the atmospheric leaching kinetics of comminuted nickeliferous sulfide matte containing about 20% to 75% nickel, about 5% to 50% copper, non-stoichiometric sulfur in the range of about 13% to 16% and over 0.5% to about 8% iron, the sum of the nickel, copper and sulfur contents being at least about 80%, and thereby selectively effect the rapid dissolution of substantial amounts of nickel from said matte and leave a residue impoverished in said nickel, which comprises, providing said matte in particulate leachable form, subjecting said particulate matte to atmospheric leaching under oxidizing conditions in a confined column of sulfuric acid-copper sulfate solution containing about 10 gpl to 200 gpl $H_2SO_4$ and 5 gpl to 100 gpl copper, with the mole ratio of $H_2SO_4$ to copper in said leach solution ranging from about 0.5:1 to 2.5:1 and the temperature from about 50° C to 100° C, the amount of solution being such as to provide about 0.4 to 0.8 mole of said $H_2SO_4$ plus copper in said solution for each mole of nickel in said matte while injecting a flow of air into the bottom of said solution column at a rate and a partial pressure of oxygen sufficient to sustain said rapid dissolution of nickel, selectively controlling the kinetics of said leaching to effect rapid dissolution of substantial amounts of nickel from said matte while controlling the residual amounts of copper and iron in the final pregnant solution to below predetermined amounts:

(1) such that to obtain a final nickel solution containing less than about 20 ppm copper and less than about 100 ppm iron, the acid-to-copper mole ratio is controlled to at least about 1.5:1 at a temperature of over about 75° C. and (2) such that to obtain a final nickel solution containing less than 20 ppm copper and less than about 20 ppm iron, the acid-to-copper mole ratio is controlled at less than about 1.5:1 at a temperature of less than about 70° C.

4. The method of claim 3, wherein following the completion of said atmospheric leach, the residue thereof is subjected to sulfuric acid leaching using air as an oxidant at elevated temperature and pressure to dissolve the metal values nickel and copper therein, and the solution then subjected to copper electrowinning to produce electrolytic copper and a spent sulfuric acid-copper sulfate electrolyte, the spent electrolyte providing solution for use in the atmospheric leaching of said matte.

5. A method of controlling the atmospheric leaching kinetics of comminuted nickeliferous sulfide matte containing about 20% to 75% nickel, about 5% to 50% copper, non-stoichiometric sulfur in the range of about 17% to 23% and over 0.5% to about 8% iron, the sum of the nickel, copper and sulfur contents being at least about 80% and thereby selectively effect the rapid dissolution of substantial amounts of nickel from said matte and leave a residue impoverished in nickel, which comprises, providing said matte in particulate leachable form, subjecting said particulate matte to atmospheric leaching under oxidizing conditions in a confined column of sulfuric acid-copper sulfate solution containing about 10 gpl to 200 gpl $H_2SO_4$ and 5 gpl to 100 gpl copper, with the mole ratio of $H_2SO_4$-to-copper ranging from about 0.5:1 to 2.5:1 and the temperature from about 50° C to 100° C while injecting a flow of air into the bottom of said solution column at a rate and a partial pressure of oxygen sufficient to sustain said rapid dissolution of nickel, selectively controlling the conditions of leaching to effect rapid dissolution of substantial amounts of nickel from said matte by:

adjusting the ratio of leach solution to matte so as to provide about 0.4 to 0.8 mole of said $H_2SO_4$ plus copper in said solution for each mole of nickel in said matte, adjusting the mole ratio of $H_2SO_4$-to-copper in said solution to at least about 1.8 at a temperature of over about 75° C, and continuing the leaching of said matte under said controlled conditions to decrease the copper and/or iron in said solution to below 20 ppm.

6. The method of claim 5, wherein the oxygen partial pressure employed varies inversely to the sulfur content of the matte.

7. The method of claim 5, wherein the rate of injection of said air is maximized until a pH of about 2.5 is reached and thereafter decreased to inhibit oxidation of copper in the leach residue.

8. The method of claim 7, wherein either the gas flow rate or the partial rpessure of oxygen is decreased when a pH of 4 is reached in said solution to inhibit redissolution of copper.

9. The method of claim 5, wherein following the completion of said atmospheric leach, the residue thereof is subjected to sulfuric acid leaching using air as an oxidant at elevated temperature and pressure to dissolve the metal values nickel and copper therein, and the solution then subjected to copper electrowinning to produce electrolytic copper and a spent sulfuric acid-copper sulfate electrolyte, the spent electrolyte providing solution for use in the atmospheric leaching of said matte.

10. A method of controlling the atmospheric leaching kinetics of comminuted nickeliferous sulfide matte containing about 20% to 75% nickel, about 5% to 50% copper, non-stoichiometric sulfur in the range of about 13% to 16% and over 0.5% to about 8% iron, the sum of the nickel, copper and sulfur contents being at least about 80% and thereby selectively effect the rapid dissolution of substantial amounts of nickel from said matte and leave a residue impoverished in nickel, which comprises, providing said matte in particulate leachable form, subjecting said particulate matte to atmospheric leaching under oxidizing conditions in a confined column of sulfuric acid-copper sulfate solution containing about 10 gpl to 200 gpl $H_2SO_4$ and 5 gpl to 100 gpl copper, with the mole ratio of $H_2SO_4$-to-copper ranging from about 0.5:1 to 2.5:1 and the temperature from about 50° C to 100° C while injecting a flow of air into the bottom of said solution column at a rate and a partial pressure of oxygen sufficient to sustain said rapid dissolution of nickel, selectively controlling the conditions of said leaching to effect rapid dissolution of substantial amounts of nickel from said matte by:

adjusting the ratio of leach solution to matte so as to provide about 0.4 to 0.8 mole of said $H_2SO_4$ plus copper in said solution for each mole of nickel in said matte, adjusting the mole ratio of $H_2SO_4$-to-copper in said solution to less than about 1.5:1 at a temperature less than about 70° C, and continuing the leaching of said matte under said controlled conditions to decrease the copper and/or iron in said solution to below 20 ppm.

11. The method of claim 10, wherein the oxygen partial pressure employed varies inversely to the sulfur content of the matte.

12. The method of claim 10, wherein the rate of injection of said air is maximized until a pH of about 2.5 is reached and thereafter decreased to inhibit oxidation of copper in the leach reside.

13. The method of claim 12, wherein either the gas flow rate or the partial pressure of oxygen is decreased when a pH of 4 is reached in said solution to inhibit redissolution of copper.

14. The method of claim 6, wherein following the completion of said atmospheric leach, the residue thereof is subjected to sulfuric acid leaching using air as an oxidant at an elevated temperature and pressure to dissolve the metal values nickel and copper therein, and the solution then subjected to copper electrowinning to produce electrolytic copper and a spent sulfuric acid-copper sulfate electrolyte, the spent electrolyte providing solution for use in the atmospheric leaching of said matte.

* * * * *